United States Patent Office 3,425,314
Patented Feb. 4, 1969

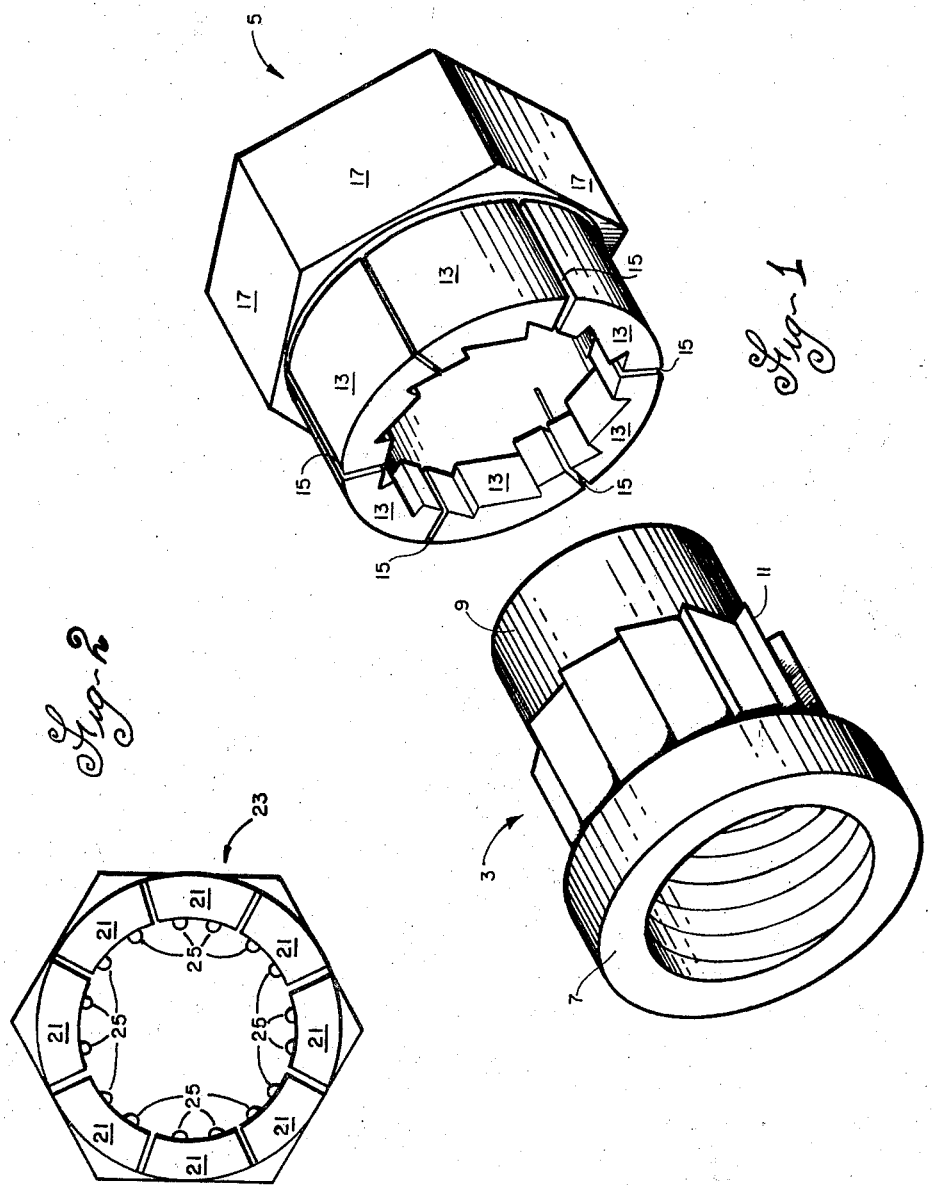

3,425,314
SPRING BEAM LOAD LIMITING NUT
John F. Ohlson, 214 Canterbury Road,
Havertown, Pa. 19083
Filed Aug. 9, 1967, Ser. No. 659,545
U.S. Cl. 85—61    7 Claims
Int. Cl. F16b 2/04; B25b 5/16

ABSTRACT OF THE DISCLOSURE

A unique torque limiting nut which utilizes the cantilever beam principle in controlling the amount of torque that is applied during the nut tightening operation. The nut includes an internally threaded member and a driver member having cooperating frictionally engaging means therebetween to permit rotation of the threaded member by the driver member, and said driver member additionally having means to permit the frictionally engaging means to slip past one another upon reaching a predetermined torque.

---

The invention described herein may be manufactured and used by or for the Government of the United States of America for governmental purposes with the payment of any royalties thereon or therefor.

The present invention relates to a novel and improved threaded fastening device of the nut-bolt type. More particularly, the invention relates to a novel and improved apparatus for limiting the maximum application of torque in tightening a threaded fastening device on a complementary threaded bolt or stud.

Various types of constant torque devices for threaded nut and bolt fasteners have been devised and used in the past. The so-called torque wrench is one such commonly used device. The torque wrench, however, requires calibration at frequent intervals to guarantee accuracy and is a relatively costly instrument. Torque limiting nuts which use so-called Belleville conical disc spring elements to bias ratcheted components of the nut into operative engagement have also been used in the past. Torque limiting nuts of this kind, however, have been found to be relatively cumbersome, complex and inaccurate in use.

It is therefore a principal object of the present invention to provide a novel and improved torque limiting device which is relatively simple in construction and operation and yet highly accurate and reliable in use.

It is a further object of the invention to provide a novel and improved torque limiting device which upon reaching a predetermined load will slip, permitting continued rotation of the nut without advancement of the nut on the bolt or stud.

It is a further object of the invention to provide a novel and improved torque limiting device which utilizes the cantilever beam principle in controlling the amount of torque that may be applied in the nut tightening operation.

Other objects and many of the attendant advantages of this invention will be readily appreciated as the same becomes better understood by reference to the following detailed description when considered in connection with the accompanying drawing wherein:

FIG. 1 of the drawing is a perspective view of a preferred embodiment of the invention; and FIG. 2 of the drawing is an end view of the driving member of another preferred embodiment of the invention.

In general, the improved torque limiting apparatus of the invention includes a threaded nut member having a ratcheted outer peripheral surface and an annular nut drive member which is adapted to slide onto the outer surface of the nut member. The drive member includes a plurality of circumferentially spaced radial slits that subdivide the drive member into a plurality of cantilever sections that engage the ratcheted surface of the nut member. Torque is transmitted through the drive member to the nut member until the cantilever sections flex outwardly and slip over the ratcheted surface of the nut member. In this way, the application of torque to the nut member is limited to a predetermined maximum value.

Referring now to the details of FIG. 1 of the drawing, it will be noted that the improved constant torque device of the invention includes two main component parts, the internally threaded nut member or the like 3, which is adapted to engage the complementary external threads of a suitable bolt or stud (not shown in the drawing) and the nut driver member 5, through which torque is applied to tighten the nut member 3 on the bolt or stud. The internally threaded nut member 3 is preferably of the self-locking type and is made of steel, alloy steel, brass, aluminum or any other suitable material depending on the requirements of the particular situation. The outer diameter of the nut member 3 is preferably enlarged at one end as at 7 to provide in a manner which will be more apparent hereinafter a suitable seat for the driver member 5 when the latter is positioned over the generally cylindrical opposite end 9 of the nut member during a controlled torque application of the nut member on the stud. A plurality of ratchet teeth 11 having planar working surfaces that are substantially parallel to the longitudinal axis of the nut member 3 are disposed about the outer peripheral surface of the nut member between its generally cylindrical extremity 9 and its flanged extremity 7.

The inner peripheral surface of the driver member 5 is cylindrically contoured at one end to receive and engage the cylindrical exterior surface of the nut member 3 at 9 in a manner which will be more apparent hereinafter. The opposite extremity of the driver member 5 is subdivided into a plurality of cantilever sections 13 by the radially disposed slits 15 therein. The inner peripheral surfaces of the cantilever sections 13 are contoured so as to be complementary to the ratcheted tooth portion 11 of the nut member 3. The thickness of the cantilever sections 13, the length of the slits 15 and the material from which the driver member 5 is constructed are suitably selected so as to predetermine in a manner which will be more apparent hereinafter the maximum torque that can be applied to the internally threaded nut member 3. An outer portion of the driver member 5 includes a plurality of hexagonally disposed surfaces 17 or is otherwise suitably contoured so as to receive the working end of a wrench or other tool used to apply torque to the driver member 5.

In operation, the nut member 3 is first finger tightened or otherwise suitably threaded on the bolt or stud on which it is to be applied. The driver member 5 is then slidably disposed over the external surface of the nut member 3 such that the cantilevered end of the driver member 5 is seated on the flanged extremity 7 of the nut member 3 and the inner cylindrical surface of the driver member 5 engages the complementary external cylindrical surface 9 of the nut member 3. In this position, the external ratcheted tooth portion of the nut member 3 also engages the complementary contoured internal surface of the cantilever sections 13 of the driver member 5. As torque is applied to the driver member 5 by means of a suitable wrench or other tool on its hexagonally contoured external surface 17, said torque is transmitted to the nut member 3 through the complementary working surfaces of the ratcheted portions of the driver member 5 and the nut member 3. The nut member 3 is tightened on its bolt or stud in this way. As the maximum limit of desired torque for tightening the nut member 3 on the bolt or stud is reached, the suitably designed cantilever sections 13 of the driver member 5 flex outwardly and the ratcheted working surfaces of the nut member and the driver member slip over one another. In this way, the predetermined maximum tightening torque cannot be exceeded. In removing the nut member 3 from the bolt or stud, torque in the opposite direction is transmitted from the driver member 5 to the nut member 3 through the generally radially disposed surfaces of the ratcheted portions of the nut member 3 and the driver member 5 without outward flexure of the cantilever sections 13 of the driver member 5.

Referring now to FIG. 2 of the drawing, it will be noted that the internal contour of the cantilever sections 21 of the driver member 23 includes inwardly projecting lobes 25 in place of the ratcheted contour shown in the embodiment of FIG. 1 of the drawing. These lobes 25 frictionally engage the ramp and rounded off sawtooth portions of the nut member during the controlled torque nut tightening operation in a manner similar to that described hereinabove.

Obviously, many modifications and variations of the present invention are possible in the light of the above teachings. It is therefore to be understood that within the scope of the appended claims, the invention may be practiced otherwise than as specifically described.

What is claimed is:

1. Constant torque apparatus comprising:
    (a) an internally threaded nut member which is adapted to engage a complementary externally threaded member, a portion of the outer peripheral surface of said internally threaded nut member being contoured so as to provide a set of ratchet teeth including abrupt shoulder portions and inclined surface portions extending between adjacent shoulders defining working surfaces, said working surfaces being substantially parallel to the longitudinal axis of the internally threaded nut member;
    (b) and a driver member which is adapted to slide over and engage the external peripheral surface of the internally threaded nut member, one end of said driving member having external wrench engaging means thereon, and the other end of said driver member including a plurality of circumferentially spaced axially directed radial slots extending entirely through the walls thereof to define cantilever type sections having internal protrusion means that frictionally engage the ratchet teeth of the internally threaded nut member, whereby upon reaching a predetermined torque during tightening of the nut member by the driver member, the cantilever sections flex radially outwardly permitting the protrusion means to slip over the ratchet teeth on the nut member.

2. The apparatus substantially as described in claim 1 wherein the internal contour of the cantilever sections are complementary to the ratchet teeth of the internally threaded nut member.

3. The apparatus substantially as described in claim 1 wherein the protrusion means comprise inwardly projecting lobes.

4. The apparatus substantially as described in claim 1 wherein the threads of the internally threaded nut member are of a self-locking type.

5. The apparatus substantially as described in claim 1 wherein the said cantilever sections of the driver member are predesigned so as to determine the maximum torque that can be applied to the internally threaded nut member.

6. The apparatus substantially as described in claim 1 including an external cylindrical surface on the internally threaded nut member extending beyond that portion which includes the said ratchet teeth and is adapted to frictionally engage the smooth cylindrical internal surface of the non-cantilevered portion of the driver member.

7. The apparatus substantially as described in claim 1 wherein the internally threaded nut member includes an enlarged external flanged extremity that bears upon the ends of the cantilever sections of the driver member when the driver member is positioned on the internally threaded nut member for a controlled application of torque.

References Cited
UNITED STATES PATENTS

| | | | |
|---|---|---|---|
| 976,847 | 11/1910 | Chamberlin | 151—22 |
| 2,685,812 | 8/1954 | Dmitroff | 85—61 |
| 3,280,690 | 10/1966 | Rubin | 85—61 |

CARL W. TOMLIN, *Primary Examiner.*

R. S. BRITTS, *Assistant Examiner.*

U.S. Cl. X.R.

81—52.4